(12) United States Patent
Seki

(10) Patent No.: US 12,304,220 B2
(45) Date of Patent: May 20, 2025

(54) DEFECT INSPECTION DEVICE, DEFECT INSPECTION METHOD, AND PROGRAM, AND PRINTING DEVICE AND METHOD OF MANUFACTURING PRINTED MATTER

(71) Applicant: FUJIFILM Corporation, Tokyo (JP)

(72) Inventor: Masaki Seki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 18/064,544

(22) Filed: Dec. 12, 2022

(65) Prior Publication Data

US 2023/0103391 A1   Apr. 6, 2023

Related U.S. Application Data

(63) Continuation of application No. PCT/JP2021/022233, filed on Jun. 11, 2021.

(30) Foreign Application Priority Data

Jun. 19, 2020   (JP) .................................. 2020-106155

(51) Int. Cl.
 *B41J 2/21*   (2006.01)
 *G01N 21/892*   (2006.01)
(52) U.S. Cl.
 CPC ........... *B41J 2/2142* (2013.01); *B41J 2/2139* (2013.01); *B41J 2/2146* (2013.01); *G01N 21/892* (2013.01)

(58) Field of Classification Search
 CPC ...... B41J 2/2142; B41J 2/2146; B41J 29/393; B41J 2/2139; B41J 2/2135; B41J 2/2132;
 (Continued)

(56) References Cited

U.S. PATENT DOCUMENTS

2006/0203028 A1   9/2006   Agarwal et al.
2012/0050378 A1   3/2012   Kido
(Continued)

FOREIGN PATENT DOCUMENTS

JP   H07-186375 A   7/1995
JP   2000280461 A   * 10/2000   ............. B41J 2/125
(Continued)

OTHER PUBLICATIONS

The extended European search report issued by the European Patent Office on Nov. 8, 2023, which corresponds to European Patent Application No. 21825668.3-1014 and is related to U.S. Appl. No. 18/064,544.
(Continued)

*Primary Examiner* — Jannelle M Lebron
(74) *Attorney, Agent, or Firm* — Studebaker Brackett PLLC

(57) ABSTRACT

Provided are a defect inspection device, a defect inspection method, and a program, and a printing device and a method of manufacturing a printed matter, in which a defect of a
(Continued)

printed matter is inspected by performing registration between reference data and imaging data of the printed matter printed on the basis of the reference data with high accuracy at high speed. The reference data and the imaging data of the printed matter printed on the basis of the reference data by a single-pass type printing device that includes an inkjet head having a plurality of nozzles disposed in a nozzle direction are acquired, registration between the imaging data and the reference data in the nozzle direction is performed by using nozzle mapping information indicating a correspondence relationship between positions of the plurality of nozzles and pixel positions of the imaging data in the nozzle direction, and a defect of the printed matter is inspected in response to an input of the imaging data and the reference data that have been subjected to registration.

14 Claims, 9 Drawing Sheets

(58) Field of Classification Search
CPC .................. B41J 2/0451; B41J 2/16579; B41J 2029/3935; B41J 2/16585; G06N 3/08; G01N 21/892; G01N 21/8921
See application file for complete search history.

(56) References Cited

U.S. PATENT DOCUMENTS

| | | |
|---|---|---|
| 2012/0154837 A1 | 6/2012 | Yamazaki |
| 2013/0329144 A1 | 12/2013 | Fukasawa et al. |
| 2019/0236738 A1 | 8/2019 | Lebel et al. |
| 2021/0114368 A1 | 4/2021 | Ukishima |

FOREIGN PATENT DOCUMENTS

| | | | |
|---|---|---|---|
| JP | 2014-066618 A | 4/2014 | |
| JP | 2019-101540 A | 6/2019 | |
| JP | 2019-111693 A | 7/2019 | |
| WO | WO-2020022024 A1 * | 1/2020 | ............ B41J 2/0451 |

OTHER PUBLICATIONS

International Search Report issued in PCT/JP2021/022233; mailed Aug. 10, 2021.
International Preliminary Report on Patentability issued in PCT/JP2021/022233; issued Dec. 13, 2022.
Communication pursuant to Article 94(3) EPC issued by the European Patent Office on Oct. 29, 2024, which corresponds to European Patent Application No. 21 825 668.3-1014 and is related to U.S. Appl. No. 18/064,544.

* cited by examiner

FIG.7
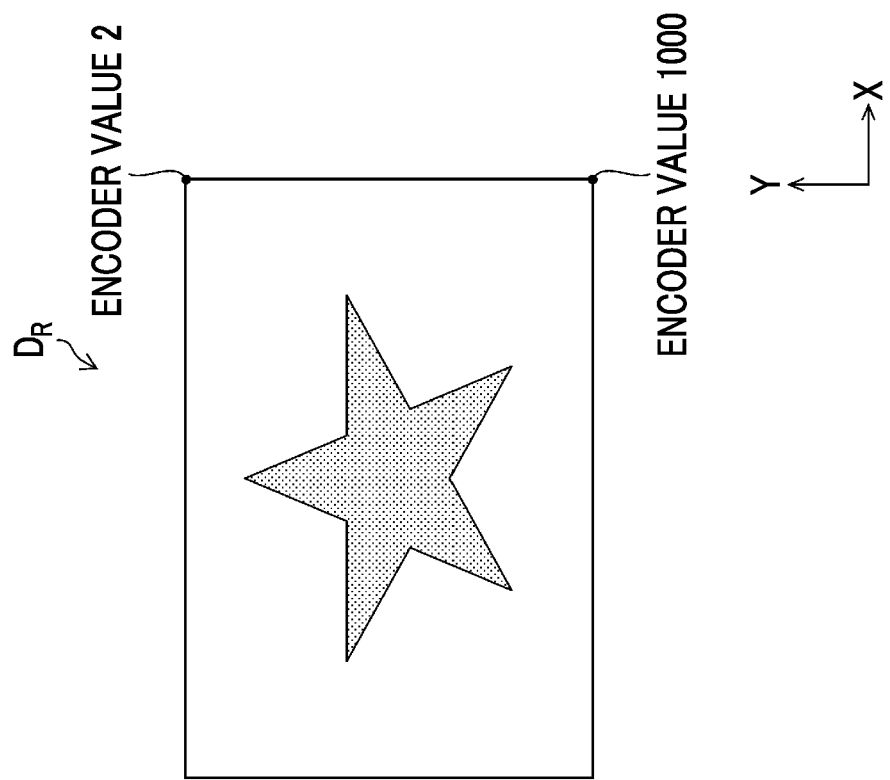
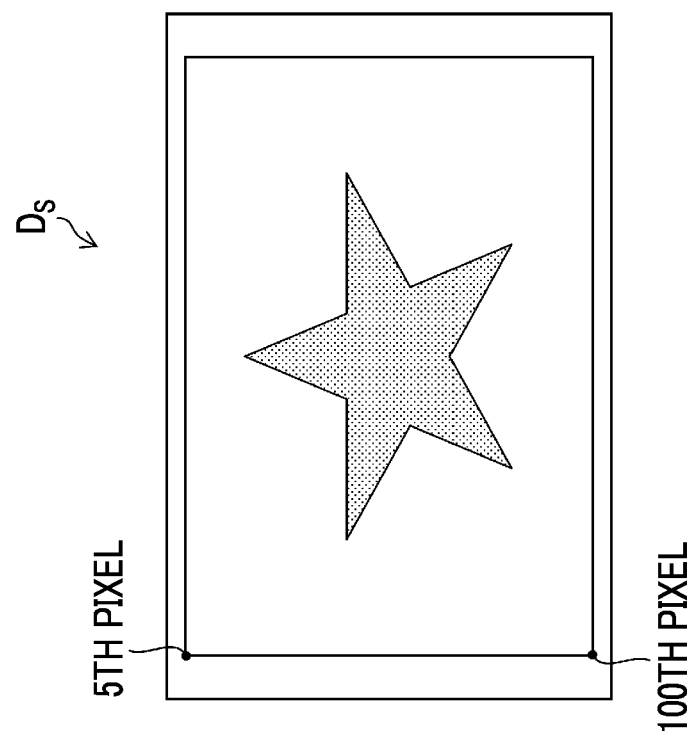

DEFECT INSPECTION DEVICE, DEFECT INSPECTION METHOD, AND PROGRAM, AND PRINTING DEVICE AND METHOD OF MANUFACTURING PRINTED MATTER

CROSS-REFERENCE TO RELATED APPLICATIONS

The present application is a Continuation of PCT International Application No. PCT/JP2021/022233 filed on Jun. 11, 2021 claiming priority under 35 U.S.C § 119(a) to Japanese Patent Application No. 2020-106155 filed on Jun. 19, 2020. Each of the above applications is hereby expressly incorporated by reference, in its entirety, into the present application.

BACKGROUND OF THE INVENTION

1. Field of the Invention

The present invention relates to a defect inspection device, a defect inspection method, and a program, and a printing device and a method of manufacturing a printed matter, and particularly to a technique of detecting a defect of an inspection target by comparing imaging data obtained by imaging the inspection target and reference data as a reference.

2. Description of the Related Art

A defect inspection device that inspects a defect of a target by comparing imaging data obtained by imaging the target using a scanner and reference data as a reference has been widely used. As an application destination of an inspection method based on this method, there is a printed matter defect inspection device for inspecting printing defects such as streaks and ink missing of a printed matter printed by a printing device (see JP1995-186375A (JP-H07-186375A)).

In the conventional printed matter defect inspection, a method of performing a defect inspection of a printed matter by acquiring in advance reference data that is imaging data of the printed matter as a reference, which is printed under the same condition, and by comparing the reference data with imaging data of the printed matter being printed has been widely performed. However, this method has a problem that a defect inspection of a printed matter in which a pattern changes for each sheet, such as variable printing, and a defect inspection of a first printed matter after changing printing conditions cannot be performed.

For example, in a case of performing an inspection for a printed matter of glossy paper by acquiring reference data from the printed matter using glossy paper, and then of inspecting a printed matter of wood-free paper on which the same pattern is printed, because the brightness value of the entire data differs depending on paper, there is a large difference between the acquired reference data of the printed matter of the glossy paper and the imaging data of the printed matter of the wood-free paper, and it is necessary to lower the inspection performance in a case of comparing the reference data and the imaging data as they are. In addition, in order to perform the inspection without lowering the inspection performance, it is necessary to re-acquire the reference data from the printed matter using the wood-free paper.

In response to such a problem, it is conceivable to perform the inspection using print data based on a print source image of the printed matter as the reference data.

SUMMARY OF THE INVENTION

However, there is a problem that it is difficult to perform registration between the reference data and the imaging data in a case of performing the inspection using the print data as the reference data.

The conventional registration method is generally a matching method of matching features in images, but there is a problem that processing is slowed down in a case of performing the matching method on a large-sized image, such as a captured image of a printed matter. In particular, there is a problem that the processing time and the registration have a trade-off relationship in which the processing becomes slower as the registration is performed with higher accuracy.

The present invention has been made in view of such circumstances, and an object of the present invention is to provide a defect inspection device, a defect inspection method, and a program, and a printing device and a method of manufacturing a printed matter, in which a defect of a printed matter is inspected by performing registration between reference data and imaging data of the printed matter printed on the basis of the reference data with high accuracy at high speed.

According to one aspect for achieving the above object, there is provided a defect inspection device that inspects a defect of a printed matter printed on the basis of reference data by a single-pass type printing device that includes an inkjet head which has a plurality of nozzles disposed in a nozzle direction and a moving mechanism which moves the inkjet head and a print medium relative to each other in a relative movement direction intersecting with the nozzle direction, the defect inspection device comprising: a memory that stores a command to be executed by a processor; and the processor that executes the command stored in the memory, in which the processor acquires the reference data and imaging data based on a captured image in which the printed matter is imaged, acquires nozzle mapping information indicating a correspondence relationship between positions of the plurality of nozzles and pixel positions of the imaging data in the nozzle direction, performs a nozzle direction registration process of performing registration between the imaging data and the reference data in the nozzle direction by using the nozzle mapping information, and performs a defect inspection process of calculating defect information in response to an input of the imaging data and the reference data after performing the nozzle direction registration process.

According to this aspect, it is possible to inspect the defect of the printed matter by performing registration between the reference data and the imaging data of the printed matter printed on the basis of the reference data with high accuracy at high speed.

It is preferable that the processor acquires print timing information indicating a correspondence relationship between a print timing of the reference data and the pixel position of the imaging data in the relative movement direction, performs a relative movement direction registration process of performing registration between the imaging data and the reference data in the relative movement direction by using the print timing information, and performs the defect inspection process of calculating the defect information in response to an input of the imaging data and the reference data after performing the nozzle direction registration process and the relative movement direction registration process. With this, it is possible to perform registration between the imaging data and the reference data in the relative movement direction with high accuracy at high speed.

It is preferable that the relative movement direction registration process has a start timing calculation process of calculating a print start timing of the reference data in the print timing information. With this, it is possible to appropriately perform registration between the imaging data and the reference data in the relative movement direction.

It is preferable that in the start timing calculation process, a chart-captured image in which a correction chart having a reference line is imaged is analyzed, and a position of the reference line is used. With this, it is possible to appropriately calculate the print start timing of the reference data.

It is preferable that the print timing information is information based on an encoder value of the moving mechanism. With this, it is possible to appropriately acquire the print timing information.

It is preferable that the encoder value is embedded in the captured image. With this, it is possible to appropriately acquire the print timing information.

It is preferable that the nozzle mapping information includes at least one of a plurality of information corresponding to a thickness of the print medium or information corrected by a correction process corresponding to the thickness. With this, it is possible to appropriately acquire the nozzle mapping information.

It is preferable that the processor performs the defect inspection process by using a deep learning model that receives the imaging data and the reference data, as an input. The present embodiment is suitable for the defect inspection process using a deep learning model.

According to one aspect for achieving the above object, there is provided a single-pass type printing device that includes an inkjet head which has a plurality of nozzles disposed in a nozzle direction and a moving mechanism which moves the inkjet head and a print medium relative to each other in a relative movement direction intersecting with the nozzle direction, the printing device comprising: a scanner that images the printed matter to generate a captured image; and the defect inspection device described above.

According to this aspect, it is possible to inspect the defect of the printed matter by performing registration between the reference data and the imaging data of the printed matter printed by the inkjet head on the basis of the reference data with high accuracy at high speed.

According to one aspect for achieving the above object, there is provided a defect inspection method of inspecting a defect of a printed matter printed on the basis of reference data by a single-pass type printing device that includes an inkjet head which has a plurality of nozzles disposed in a nozzle direction and a moving mechanism which moves the inkjet head and a print medium relative to each other in a relative movement direction intersecting with the nozzle direction, the defect inspection method comprising: a data acquisition step of acquiring the reference data and imaging data based on a captured image in which the printed matter is imaged; a nozzle mapping information acquisition step of acquiring nozzle mapping information indicating a correspondence relationship between positions of the plurality of nozzles and pixel positions of the imaging data in the nozzle direction; a nozzle direction registration step of performing a nozzle direction registration process of performing registration between the imaging data and the reference data in the nozzle direction by using the nozzle mapping information; and a defect inspection step of performing a defect inspection process of calculating defect information in response to an input of the imaging data and the reference data after performing the nozzle direction registration process.

According to this aspect, it is possible to inspect the defect of the printed matter by performing registration between the reference data and the imaging data of the printed matter printed on the basis of the reference data with high accuracy at high speed.

According to one aspect for achieving the above object, there is provided a method of manufacturing a printed matter, comprising: a printing step of printing a printed matter on the basis of reference data through a single-pass type printing device that includes an inkjet head which has a plurality of nozzles disposed in a nozzle direction and a moving mechanism which moves the inkjet head and a print medium relative to each other in a relative movement direction intersecting with the nozzle direction; the defect inspection method described above; and a quality determination step of determining quality of the printed matter on the basis of the defect information.

According to this aspect, it is possible to appropriately determine the quality of the printed matter.

According to one aspect for achieving the above object, there is provided a program for causing a computer to execute the defect inspection method described above. In this aspect, a non-transitory computer-readable recording medium having this program recorded thereon may be provided.

According to this aspect, it is possible to inspect the defect of the printed matter by performing registration between the reference data and the imaging data of the printed matter printed on the basis of the reference data with high accuracy at high speed.

According to the present invention, since it is possible to inspect the defect of the printed matter by performing registration between the reference data and the imaging data of the printed matter printed on the basis of the reference data with high accuracy at high speed, it is possible to prevent decrease in inspection performance caused by misregistration.

BRIEF DESCRIPTION OF THE DRAWINGS

FIG. 7 is a diagram showing an example of the imaging data and the reference data.

DESCRIPTION OF THE PREFERRED EMBODIMENTS

Hereinafter, preferred embodiments of the present invention will be described in detail with reference to the accompanying drawings.

<Configuration of Defect Inspection Device>

Figure 1:
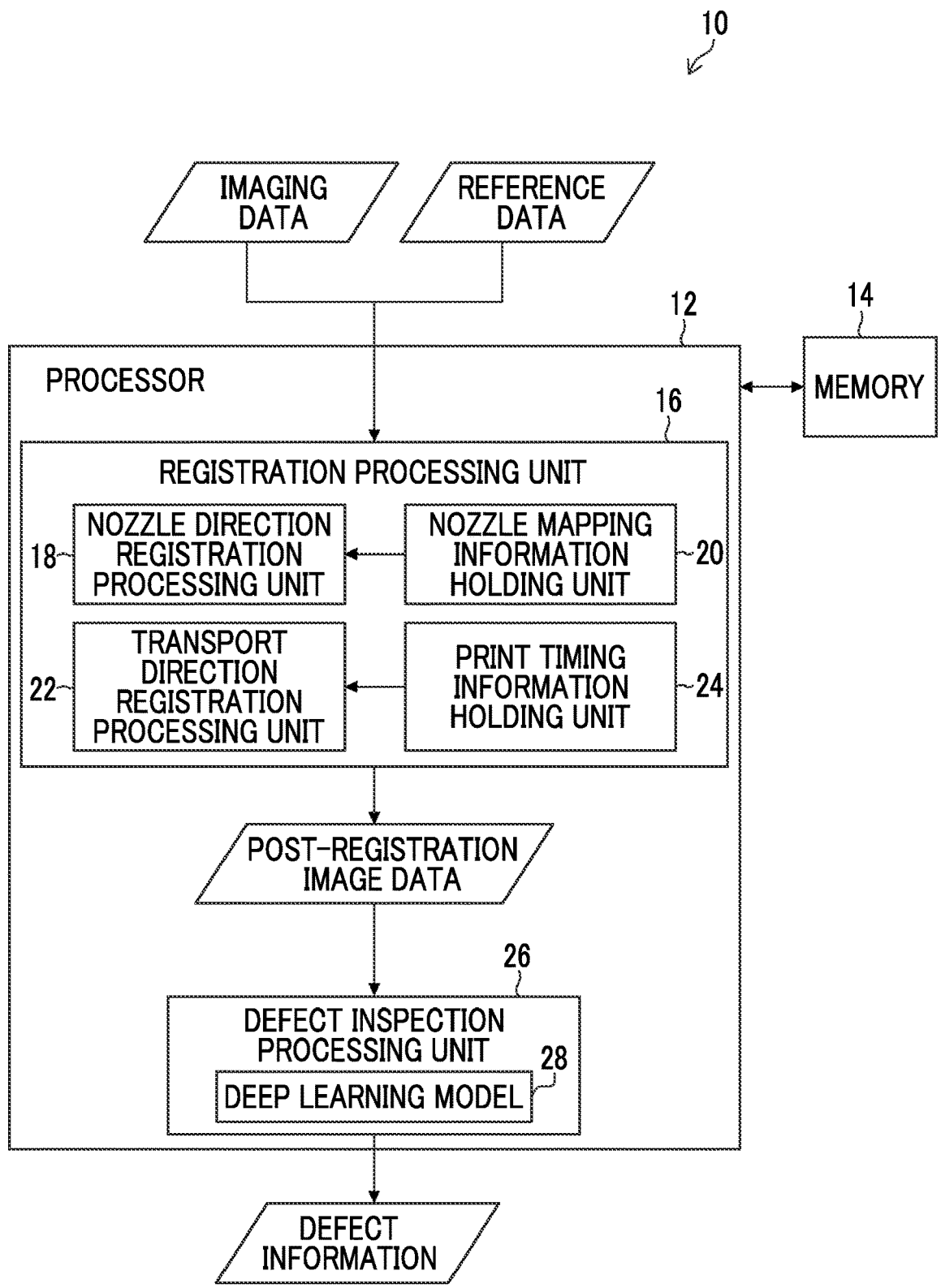
FIG. 1 is a block diagram showing a configuration of a defect inspection device.

FIG. 1 is a block diagram showing the configuration of a defect inspection device 10. The defect inspection device 10 is a device that inspects a defect of a printed matter printed on the basis of reference data by a single-pass type printing device (for example, an inkjet printing device 100 shown in FIG. 2). The defect inspection device 10 inspects the defect of the printed matter by comparing the reference data and imaging data based on a captured image obtained by imaging the printed matter using an imaging device (for example, a scanner 132 shown in FIG. 2). As shown in FIG. 1, the defect inspection device 10 comprises a processor 12 and a memory 14.

The processor 12 executes a command stored in the memory 14. The memory 14 stores the command to be executed by the processor 12.

The hardware structure of the processor 12 is various processors as shown below. The various processors include a central processing unit (CPU) which is a general-purpose processor that executes software (program) to function as various processing units, a graphics processing unit (GPU) which is a processor specialized in image processing, a programmable logic device (PLD) which is a processor whose circuit configuration is changeable after manufacture, such as a field programmable gate array (FPGA), and a dedicated electric circuit which is a processor that has a dedicated circuit configuration designed to execute specific processing, such as an application specific integrated circuit (ASIC).

The processor 12 may be composed of one of these various processors or may be composed of a combination of two or more processors of the same type or different types (for example, a plurality of FPGAs, or a combination of the CPU and the FPGA or a combination of the CPU and the GPU).

Further, as the hardware structure of these various processors, more specifically, an electric circuit (circuitry) in which circuit elements, such as semiconductor elements, are combined is used.

The processor 12 comprises a registration processing unit 16. The imaging data and the reference data are input to the registration processing unit 16. The registration processing unit 16 performs registration between the imaging data and the reference data, and outputs post-registration image data consisting of the imaging data and the reference data, which have been subjected to registration. Performing registration between the imaging data and the reference data refers to acquiring a correspondence relationship between each pixel of the imaging data and each pixel of the reference data.

The registration processing unit 16 comprises a nozzle direction registration processing unit 18, a nozzle mapping information holding unit 20, a transport direction registration processing unit 22, and a print timing information holding unit 24.

The nozzle direction registration processing unit 18 performs a nozzle direction registration process of performing registration between the imaging data and the reference data in a nozzle direction. That is, the nozzle direction registration processing unit 18 acquires the correspondence relationship between each pixel of the imaging data and each pixel of the reference data in the nozzle direction.

The nozzle mapping information holding unit 20 holds nozzle mapping information necessary for the nozzle direction registration process. The nozzle mapping information holding unit 20 may be provided in the memory 14. Details of the nozzle mapping information will be described later.

The transport direction registration processing unit 22 performs a transport direction registration process (an example of the relative movement direction registration process) of performing registration between the imaging data and the reference data in a transport direction (an example of the relative movement direction intersecting with the nozzle direction). That is, the transport direction registration processing unit 22 acquires a correspondence relationship between each pixel of the imaging data and each pixel of the reference data in the transport direction.

The print timing information holding unit 24 holds print timing information necessary for the transport direction registration process. The print timing information holding unit 24 may be provided in the memory 14. Details of the print timing information will be described later.

In addition, the processor 12 comprises a defect inspection processing unit 26. The post-registration image data is input to the defect inspection processing unit 26. The defect inspection processing unit 26 performs a defect inspection process of calculating defect information in response to an input of the post-registration image data, and outputs the calculated defect information.

The defect inspection processing unit 26 comprises a deep learning model 28. The deep learning model 28 is a trained model that outputs the defect information of the printed matter in response to an input of the imaging data and the reference data. The deep learning model 28 has a plurality of layer structures and holds a plurality of weight parameters. The deep learning model 28 can change from an untrained model to a trained model by updating the weight parameter from the initial value to the optimum value. The defect information includes at least one of a defect presence/absence, a defect position, or a defect recognition intensity value.

<Configuration of Printing Device>

Figure 2:
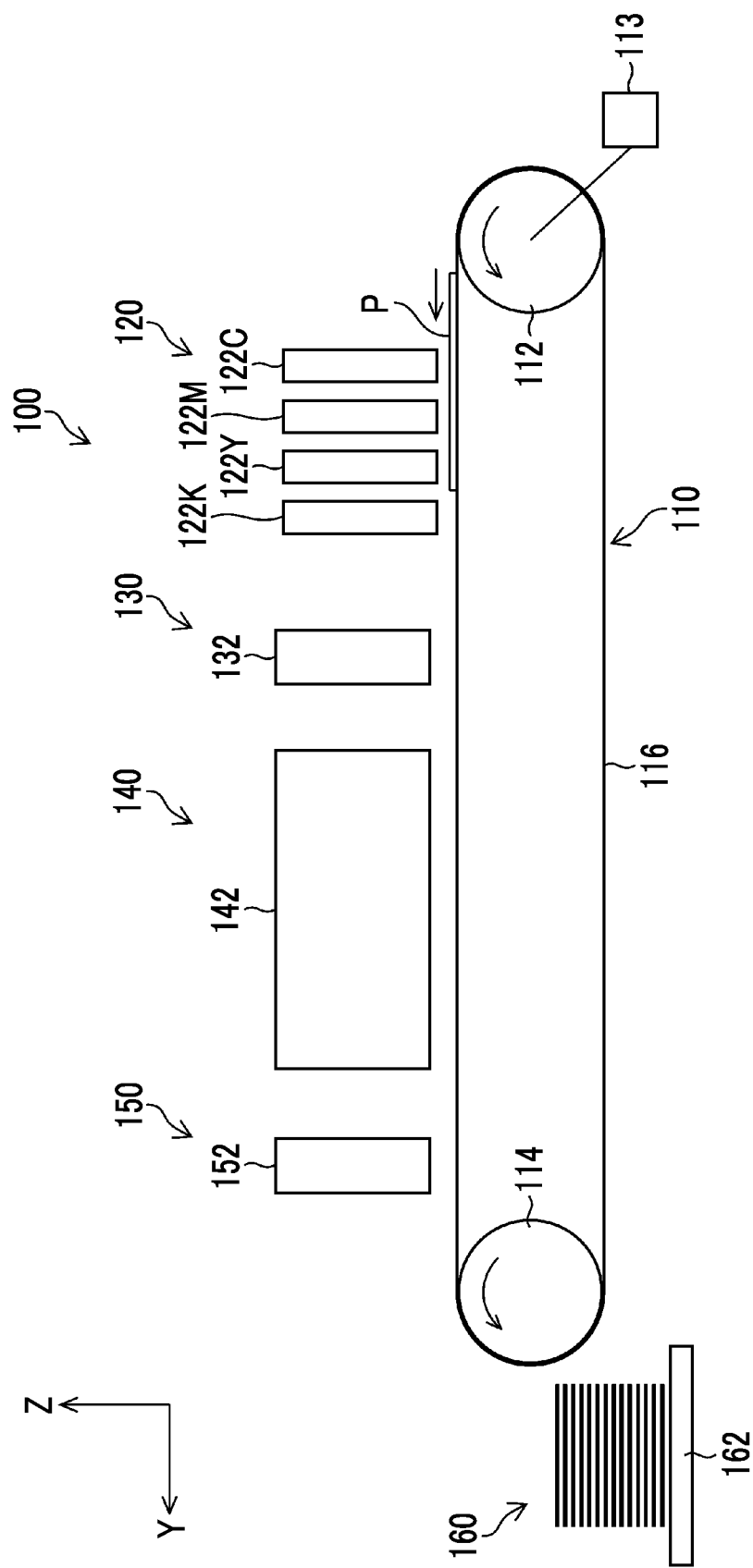
FIG. 2 is an overall configuration diagram of an inkjet printing device.

Next, the single-pass type printing device to which the defect inspection device 10 is applied will be described. FIG. 2 is an overall configuration diagram of the inkjet printing device 100. In FIG. 2, X, Y, and Z directions are orthogonal to each other, the X and Y directions are horizontal directions, and the Z direction is a vertical direction. The inkjet printing device 100 is a printer that prints a color image by jetting four colors of ink, cyan (C), magenta (M), yellow (Y), and black (K), onto sheet-fed paper P, which is a print medium.

General-purpose print paper is used as the paper P. The general-purpose print paper refers to paper mainly containing cellulose such as coated paper used for general offset printing or the like, not so-called inkjet paper. Further, water-based ink is used as the ink. The water-based ink refers to ink obtained by dissolving or dispersing water and a coloring material, such as a dye and a pigment, in a solvent soluble in water.

As shown in FIG. 2, the inkjet printing device 100 comprises a transport unit 110, a printing unit 120, an imaging unit 130, a drying unit 140, a sorting unit 150, and a sheet discharge unit 160.

[Transport Unit]

The transport unit 110 is a transport mechanism that transports paper P fed from a sheet feed unit (not shown) in the transport direction (Y direction). The transport unit 110 corresponds to a moving mechanism that moves the printing unit 120 and the paper P relative to each other in the relative movement direction. The transport unit 110 comprises an upstream pulley 112, a rotary encoder 113, a downstream pulley 114, and a transport belt 116.

The upstream pulley 112 has a rotary shaft (not shown) extending in the horizontal direction, and the rotary shaft is rotatably supported. The rotary encoder 113 is disposed on the upstream pulley 112. The rotary encoder 113 outputs an encoder value corresponding to the rotation of the upstream pulley 112.

The downstream pulley 114 has a rotary shaft (not shown) parallel to the rotary shaft of the upstream pulley 112, and the rotary shaft is rotatably supported.

The transport belt 116 is an endless belt made of stainless steel. The transport belt 116 is bridged between the upstream pulley 112 and the downstream pulley 114. The transport belt 116 made of stainless steel is used for the transport unit 110 so that the flatness of the paper P can be kept favorably.

The downstream pulley 114 has a motor (not shown) as a driving means. In a case where the motor is driven, the downstream pulley 114 rotates counterclockwise in FIG. 2. The upstream pulley 112 is driven by the rotation of the downstream pulley 114 and rotates counterclockwise in FIG. 2. The transport belt 116 runs between the upstream pulley 112 and the downstream pulley 114 along a running path with the rotation of the upstream pulley 112 and the downstream pulley 114.

The paper P supplied from the sheet feed unit (not shown) is placed on the transport surface of the transport belt 116. The transport unit 110 transports the paper P placed on the transport belt 116 along a transport path from the upstream pulley 112 toward the downstream pulley 114, and delivers the paper P to the sheet discharge unit 160. The paper P is transported while the print surface is horizontally held at positions of the transport path facing the printing unit 120, the imaging unit 130, the drying unit 140, and the sorting unit 150.

The transport belt 116 is provided with a plurality of suction holes (not shown), and the suction holes of the transport belt 116 are sucked by a pump (not shown) so that the paper P placed on the transport surface of the transport belt 116 may be adsorbed and held on the transport surface.

[Printing Unit]

The printing unit 120 prints an image on the paper P on the basis of the reference data. The printing unit 120 comprises inkjet heads 122C, 122M, 122Y, and 122K. The inkjet head 122C jets cyan ink droplets through an inkjet method. Similarly, the inkjet heads 122M, 122Y, and 122K jet magenta, yellow, and black ink droplets through the inkjet method, respectively.

The inkjet heads 122C, 122M, 122Y, and 122K are disposed at regular intervals along the transport path of the paper P through the transport belt 116. Each of the inkjet heads 122C, 122M, 122Y, and 122K is a line head having a length corresponding to a paper width. The inkjet heads 122C, 122M, 122Y, and 122K are each disposed such that a nozzle surface 124 (see FIG. 3) faces the transport belt 116.

The inkjet heads 122C, 122M, 122Y, and 122K print an image on the print surface of the paper P with a predetermined halftone type by jetting ink droplets from a plurality of nozzles 126 (see FIG. 3) disposed on the nozzle surface 124 toward the paper P transported by the transport belt 116. The timing at which each of the inkjet heads 122C, 122M, 122Y, and 122K jets ink droplets is synchronized with the encoder value obtained from the rotary encoder 113 disposed on the upstream pulley 112.

As described above, the printing unit 120 generates the printed matter using a so-called single-pass method through single scanning on the paper P transported in the Y direction by the transport belt 116.

Figure 3:
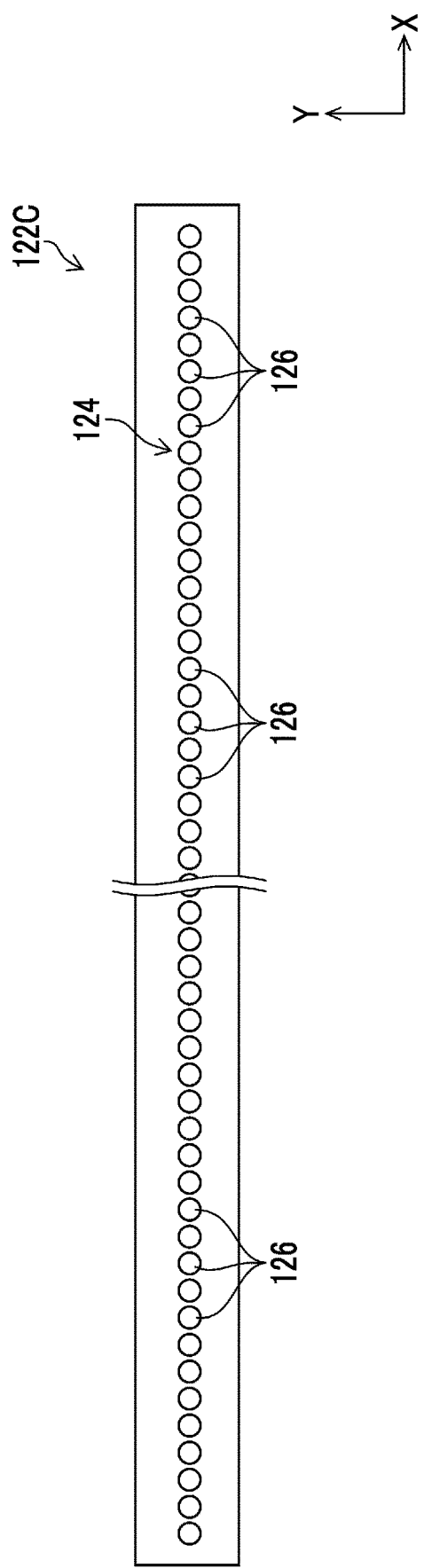
FIG. 3 is a plan view showing a nozzle surface of an inkjet head.

FIG. 3 is a plan view showing the nozzle surface 124 of the inkjet head 122C. As shown in FIG. 3, the plurality of nozzles 126 are disposed on the nozzle surface 124 in the nozzle direction (X direction). Although FIG. 3 shows an example in which the plurality of nozzles 126 are arranged in a row in the X direction for the sake of simplification of the illustration, the plurality of nozzles 126 may be two-dimensionally disposed on the nozzle surface 124. In the plurality of nozzles 126 that are two-dimensionally disposed, the nozzle rows orthographically projected onto a straight line along a direction orthogonal to the relative movement direction between the inkjet head 122C and the paper P substantially form one nozzle row. In the present embodiment, the direction orthogonal to the relative movement direction between the inkjet head 122C and the paper P can be defined as the nozzle direction.

The configurations of the inkjet heads 122M, 122Y, and 122K are the same as the configuration of the inkjet head 122C.

[Imaging Unit]

Returning to the illustration of FIG. 2, the imaging unit 130 acquires an image of the print surface of the paper P. The imaging unit 130 is disposed on the downstream side of the printing unit 120 with respect to the transport direction of the paper P. The imaging unit 130 comprises the scanner 132.

The scanner 132 is disposed such that a reading surface 134 (see FIG. 4) faces the transport belt 116. The scanner 132 is a line sensor in which a plurality of light-receiving elements 136 (see FIG. 4) are disposed side by side in the X direction on the reading surface 134. For example, a charge coupled device (CCD) sensor or a complementary metal-oxide semiconductor (CMOS) sensor can be used as the line sensor. The scanner 132 optically reads, through the plurality of light-receiving elements 136, an image that is printed on the paper P by using the inkjet heads 122C, 122M, 122Y, and 122K, and generates imaging data based on the captured image.

Figure 4:
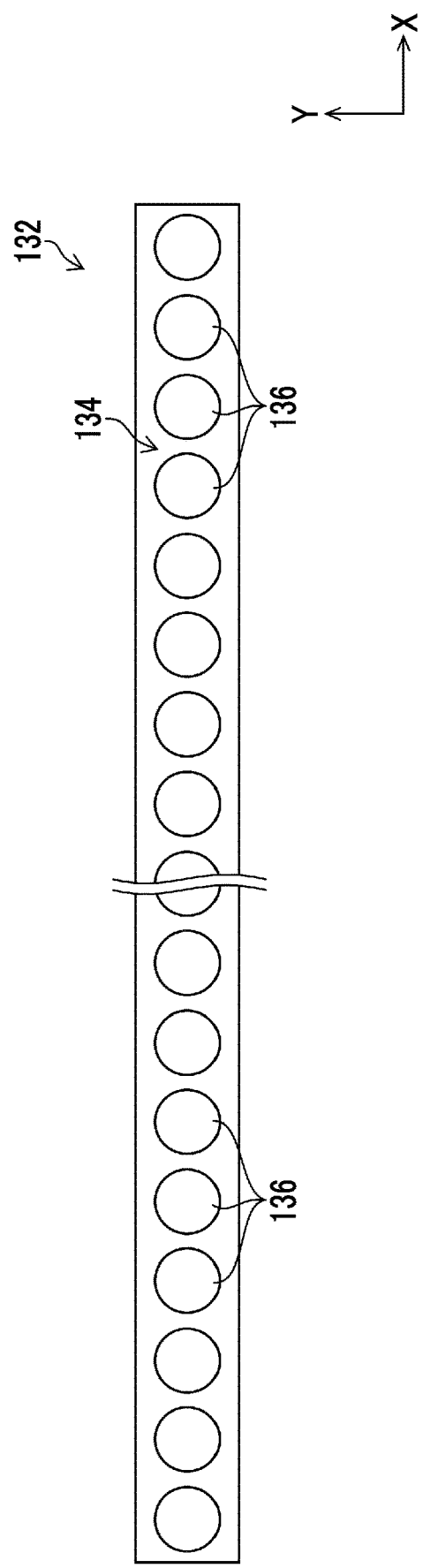
FIG. 4 is a plan view showing a reading surface of a scanner.

FIG. 4 is a plan view showing the reading surface 134 of the scanner 132. As shown in FIG. 4, the plurality of light-receiving elements 136 are disposed on the reading surface 134 in the nozzle direction (X direction). Here, the reading resolution of the scanner 132 is lower than the printing resolution of each of the inkjet heads 122M, 122Y, and 122K.

The imaging unit 130 may include a light source that irradiates the image printed on the paper P with illumination light.

[Drying Unit]

The drying unit 140 dries ink on the paper P. The drying unit 140 is disposed on the downstream side of the imaging unit 130 with respect to the transport direction of the paper P.

The drying unit 140 is provided with a heater 142. As the heater 142, for example, at least one of a halogen heater or an infrared heater is used. The heater 142 heats the print surface of the paper P to dry the ink on the paper P. The drying unit 140 may include a blowing means, such as a fan or a blower.

[Sorting Unit]

The sorting unit 150 determines the quality of the printed matter according to the defect information regarding the paper P transported by the transport belt 116, and sorts the printed matters. The sorting unit 150 is disposed on the downstream side of the drying unit 140 with respect to the transport direction of the paper P. The sorting unit 150 is provided with a stamper 152.

The stamper 152 performs a stamp process of attaching ink to the front end edge of the paper P determined to be a defective printed matter according to the quality determination for the paper P transported by the transport belt 116.

[Sheet Discharge Unit]

The sheet discharge unit 160 collects the sheets of paper P (printed matter) on which the image is printed and dried. The sheet discharge unit 160 is disposed on the downstream side of the sorting unit 150 with respect to the transport direction of the paper P, at the end point of the transport path of the transport unit 110. The sheet discharge unit 160 is provided with a sheet discharge tray 162.

The sheet discharge tray 162 stacks and collects the sheets of paper P transported by the transport belt 116. The sheet discharge tray 162 is provided with a front paper rest, a rear paper rest, and a lateral paper rest (all not shown), and the sheets of paper P are stacked in an orderly manner.

In addition, the sheet discharge tray 162 is provided so as to be vertically movable through an elevating device (not shown). The drive of the elevating device is controlled in conjunction with an increase or decrease in the number of sheets of paper P stacked on the sheet discharge tray 162. With this, among the sheets of paper P stacked on the sheet discharge tray 162, the topmost sheet of paper P is always located at a constant height.

The inkjet printing device 100 transports the paper P and moves the inkjet heads 122C, 122M, 122Y, and 122K and the paper P relative to each other, but the inkjet printing device 100 may move the inkjet heads 122C, 122M, 122Y, and 122K and the paper P relative to each other by moving the inkjet heads 122C, 122M, 122Y, and 122K in the movement direction.

[Control System of Inkjet Printing Device]

Figure 5:
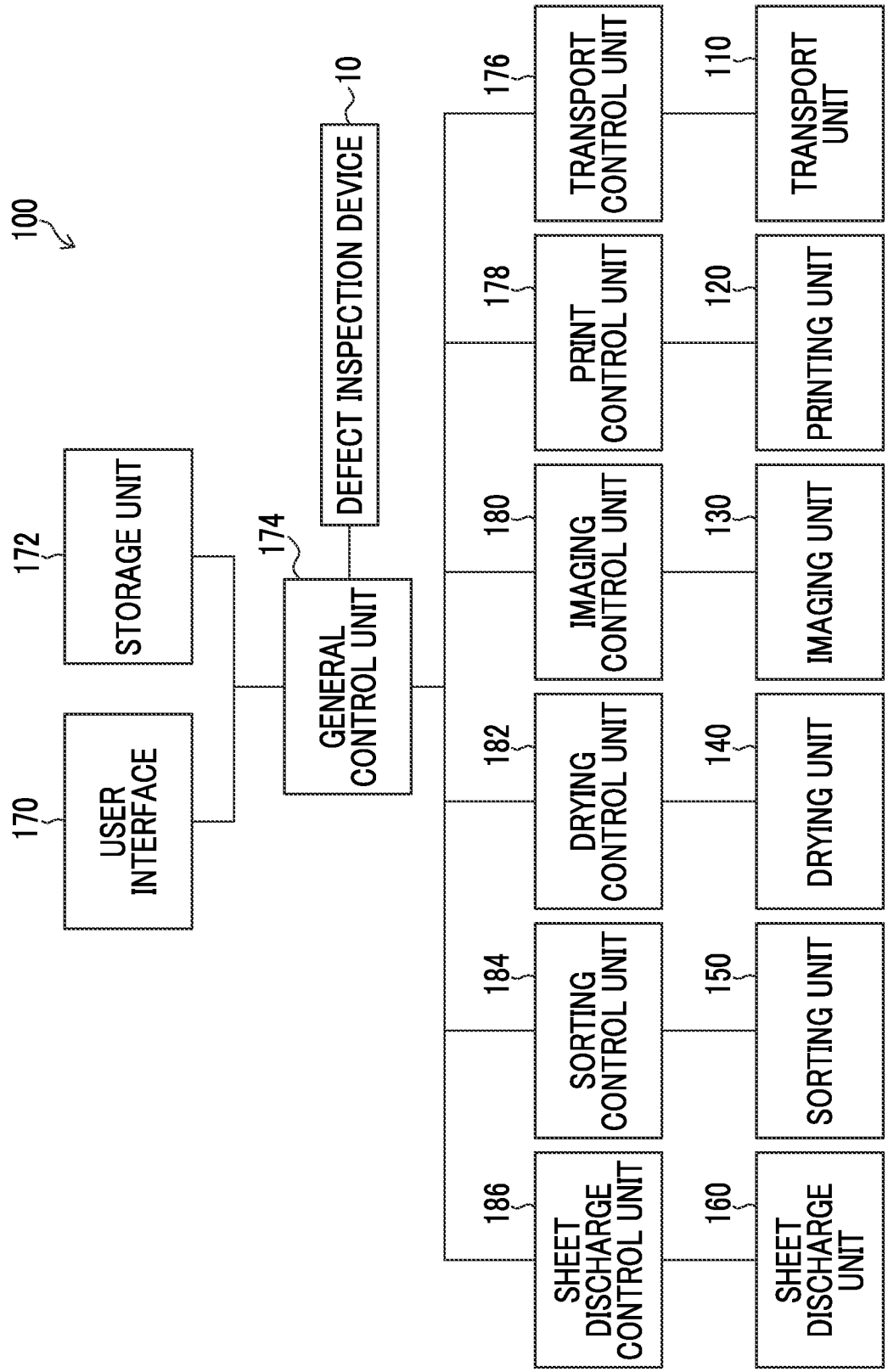
FIG. 5 is a block diagram showing a configuration of a control system of the inkjet printing device.

FIG. 5 is a block diagram showing the configuration of a control system of the inkjet printing device 100. The inkjet printing device 100 comprises the defect inspection device 10, a user interface 170, a storage unit 172, a general control unit 174, a transport control unit 176, a print control unit 178, an imaging control unit 180, a drying control unit 182, a sorting control unit 184, and a sheet discharge control unit 186.

The user interface 170 comprises an input unit (not shown) for a user to operate the inkjet printing device 100 and a display unit (not shown) for presenting information to the user. The input unit is, for example, an operation panel that receives an input from the user. The display unit is, for example, a display that displays image data and various types of information. The user can cause the inkjet printing device 100 to print a desired image by using the user interface 170.

The storage unit 172 stores a program for controlling the inkjet printing device 100 and information necessary for executing the program. The storage unit 172 is composed of non-transitory storage medium, such as a hard disk or various semiconductor memories (not shown). The storage unit 172 may store the reference data. The defect inspection device 10 may acquire the reference data from the storage unit 172.

The general control unit 174 performs various types of processing in accordance with the program stored in the storage unit 172, and controls the overall operation of the inkjet printing device 100 in an integrated manner.

The transport control unit 176 controls the motor (not shown) of the transport unit 110 to transport the paper P in the transport direction through the transport unit 110. With this, the paper P supplied from the sheet feed unit (not shown) passes through the positions facing the printing unit 120, the imaging unit 130, the drying unit 140, and the sorting unit 150, and is finally discharged to the sheet discharge unit 160. In addition, the transport control unit 176 acquires the encoder value from the rotary encoder 113.

The print control unit 178 controls the jetting of ink performed by the inkjet heads 122C, 122M, 122Y, and 122K, on the basis of the reference data based on the print source image. The print control unit 178 causes the inkjet heads 122C, 122M, 122Y, and 122K to jet cyan, magenta, yellow, and black ink droplets toward the paper P in synchronization with the encoder values acquired via the transport control unit 176, respectively. With this, a color image is printed on the print surface of the paper P, and the paper P becomes the "printed matter".

The print control unit 178 may output information on the location of a jetting-defective nozzle 126 to the general control unit 174. The defect inspection device 10 acquires the information on the location of the jetting-defective nozzle 126 from the print control unit 178.

In addition, the print control unit 178 may have a compensation function of correcting the print source image to compensate for printing performed by the jetting-defective nozzle 126. As an example, there is a compensation function of compensating for the jetting-defective nozzle 126 by increasing the volume of ink droplets of a plurality of adjacent nozzles 126. The print control unit 178 outputs information on the location of the printed matter compensated by the compensation function, to the general control unit 174. The defect inspection device 10 acquires the information on the location of the printed matter compensated by the compensation function, from the print control unit 178.

The imaging control unit 180 controls the imaging performed by the scanner 132 to cause the imaging unit 130 to read the image on the paper P (printed matter). The imaging control unit 180 causes the scanner 132 to read the image printed on the paper P in synchronization with the encoder value acquired via the transport control unit 176. The defect inspection device 10 acquires the imaging data based on the captured image read by the scanner 132.

The inkjet printing device 100 may acquire the information on the location of the jetting-defective nozzle 126 by causing the print control unit 178 to print a nozzle defect detection pattern and analyzing the captured image read by the scanner 132.

The drying control unit 182 controls the heating performed by the heater 142 to cause the drying unit 140 to dry the paper P. The heater 142 heats the paper P when the paper P passes through the position facing the heater 142.

The sorting control unit 184 controls the stamp process performed by the stamper 152 to cause the sorting unit 150 to sort the sheets of paper P. The sorting control unit 184 classifies the printed matters into a non-defective printed matter and a defective printed matter according to the defect information output from the defect inspection device 10. The sorting control unit 184 performs the stamp process through the stamper 152, in a case where the paper P passing through the position facing the stamper 152 is paper P determined to be the defective printed matter.

The sheet discharge control unit 186 controls the loading of the paper P performed by the sheet discharge tray 162. The paper P is discharged to the sheet discharge tray 162 and stacked. Ink is attached to the front end edge of the paper P of the defective printed matter. Therefore, the user can specify the defective printed matter from among the sheets of paper P loaded on the sheet discharge tray 162.

<Nozzle Mapping Information>

The nozzle mapping information held by the nozzle mapping information holding unit 20 is information indicating a correspondence relationship between the positions of pixels (pixel positions) of the imaging data in the nozzle direction and the positions of nozzles 126 of each of the inkjet heads 122C, 122M, 122Y, and 122K. That is, the nozzle mapping information indicates to which pixel in the imaging data based on the captured image read by the scanner 132 the dot jetted from which nozzle 126 is imaged.

Here, for the sake of explanation, the plurality of nozzles 126 of each of the inkjet heads 122C, 122M, 122Y, and 122K are assigned nozzle numbers 1, 2, 3, . . . in order from one toward the other in the nozzle direction.

For example, among the plurality of nozzles 126 of the inkjet head 122C, a nozzle 126 sufficiently spaced apart therefrom in the captured image continuously jets ink so that cyan line segment extending in the transport direction is printed on the paper P. The imaging data obtained by reading this line segment with the scanner 132 is acquired and which light-receiving element 136 reads the printed line segment is detected, whereby the correspondence relationship between each pixel of the imaging data and the nozzle number of the nozzle 126 that jets the ink can be acquired for the inkjet head 122C.

In this processing, ink is jetted from one nozzle 126 for each of, for example, 100 nozzles 126 of the inkjet head 122C, and a plurality of line segments extending in the transport direction and located at equal intervals in the nozzle direction are printed. The scanner 132 reads the plurality of line segments, whereby it is possible to estimate at which position of the light-receiving element 136 of the imaging data the line segment printed by each nozzle 126 of the inkjet head 122C is printed. The same applies to the inkjet heads 122M, 122Y, and 122K.

The nozzle mapping information is held, for example, as a table showing, for all the line segments, to which pixel of the imaging data the line segment printed by each nozzle 126 corresponds. As the nozzle mapping information, the pixel positions of the imaging data with respect to the nozzles 126 provided at regular intervals may be held. The nozzle mapping information held in this way may be converted into a linear form and used.

Alternatively, as the nozzle mapping information, only information indicating to which pixel positions of the imaging data the line segments of the nozzles 126 provided at both ends in the nozzle direction correspond may be held. In the nozzle mapping information held in this way, the pixel position of the imaging data with respect to each nozzle 126 may be interpolated on the assumption that all the nozzles 126 between both ends are provided at equal intervals.

In the case of the single-pass type inkjet printing device 100, the nozzle 126 that outputs each pixel in the nozzle direction in the reference data is always fixed. Therefore, it is possible to obtain from which nozzle 126 of the plurality of nozzles 126 the reference data is output. Meanwhile, it is possible to obtain to which pixel position of the imaging data the line segment printed by each nozzle 126 corresponds, from the nozzle mapping information. Therefore, it is possible to obtain to which pixel position of the imaging data the pixel of the reference data in the nozzle direction corresponds.

Figure 6:
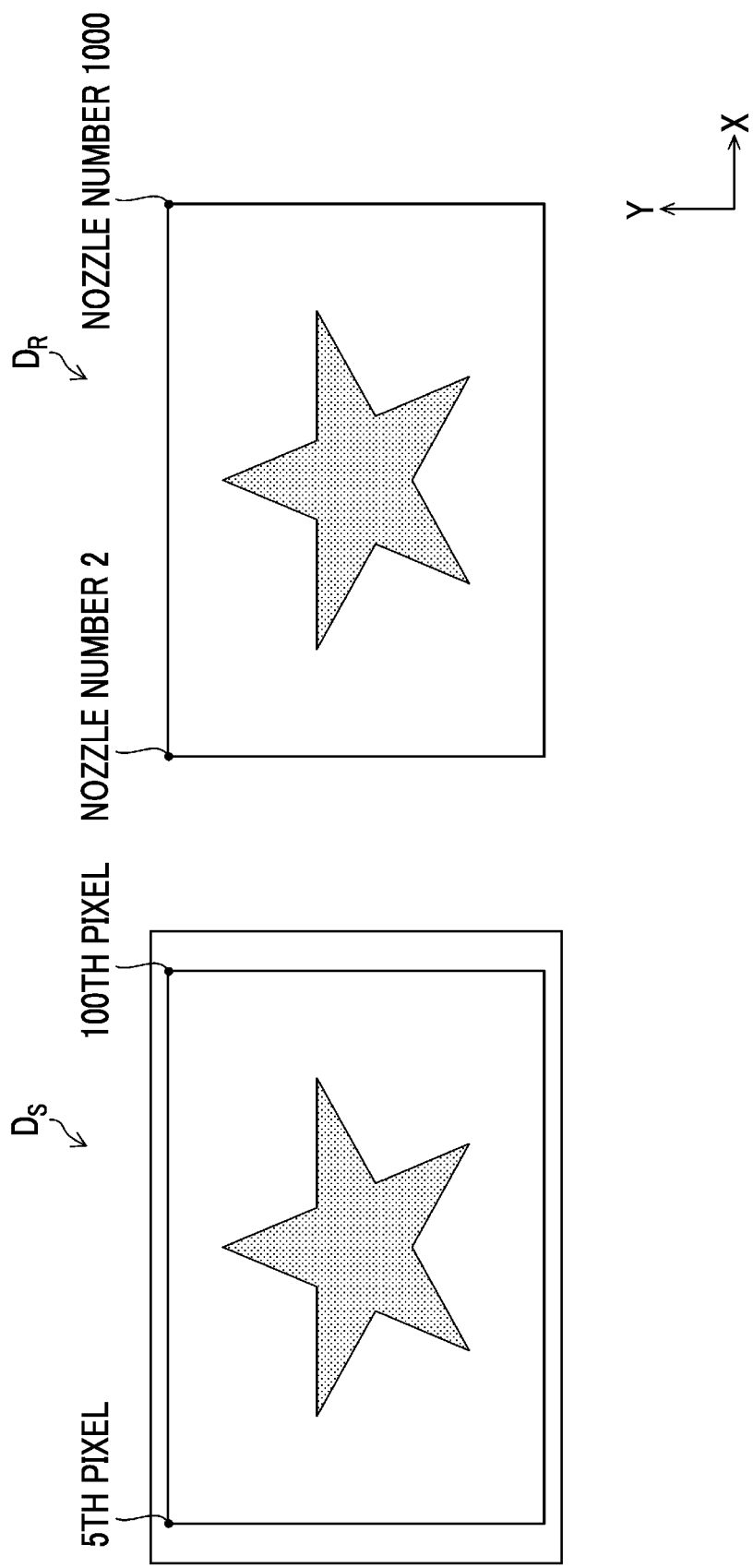
FIG. 6 is a diagram showing an example of imaging data and reference data.

FIG. 6 is a diagram showing an example of imaging data $D_S$ and reference data $D_R$. As shown in FIG. 6, in this example, for the reference data $D_R$, the left end in the nozzle direction is printed by the nozzle 126 of the nozzle number 2, and the right end in the nozzle direction is printed by the nozzle 126 of the nozzle number 1000.

Here, it is known that the 5th pixel of the imaging data corresponds to a region printed by the nozzles 126 of the nozzle numbers 2 and 3, and the 100th pixel of the imaging data corresponds to a region printed by the nozzles 126 of the nozzle numbers 999 and 1000, on the basis of the nozzle mapping information. The pixel and the nozzle number need only be made to correspond to each other through the interpolation, for the region between these.

In this way, the nozzle mapping information is used, so that it is possible to perform registration between the imaging data $D_S$ and the reference data $D_R$ in the nozzle direction.

As described above, in the inkjet printing device 100, there is a method of performing nozzle inspection by printing the nozzle defect detection pattern and analyzing the captured image read by the scanner 132, in order to determine whether or not the plurality of nozzles 126 of each of the inkjet heads 122C, 122M, 122Y, and 122K have a defect. At that time, in order to specify the nozzle 126, it is necessary to store a correspondence relationship table on which nozzle 126 performs printing at which pixel position of the captured image. The nozzle mapping information based on this correspondence relationship table may be used.

It is preferable that the nozzle mapping information is changed according to the thickness of the paper P. In a case where the printed matter is imaged by the fixed scanner 132, slight deviation occurs from the focal length of the light-receiving element 136 due to the difference in thickness of the paper P, extension and contraction occur in the captured image, and deviation occurs in the nozzle mapping information. Therefore, a plurality of nozzle mapping information are held according to the thickness of the paper P or a correction process of correcting the nozzle mapping information according to the thickness of the paper P is performed, whereby it is possible to perform registration with higher accuracy.

<Print Timing Information>

The print timing information held by the print timing information holding unit 24 is information indicating a correspondence relationship between the pixel position of the imaging data in the transport direction and the print timing of the reference data in each of the inkjet heads 122C, 122M, 122Y, and 122K. That is, the print timing information indicates, in the imaging data based on the captured image read by the scanner 132, to which pixel the dot jetted from the nozzle 126 at which timing is imaged.

The inkjet printing device 100 may print the line segment extending in the nozzle direction on the basis of the encoder value of the rotary encoder 113. In that case, the print timing information can be acquired by using the encoder value to obtain the correspondence relationship between the print timing of each line segment of the reference data and the pixel of each line segment of the imaging data.

FIG. 7 is a diagram showing an example of the imaging data $D_S$ and the reference data $D_R$. As shown in FIG. 7, in this example, the encoder value in a case where the front end of the reference data $D_R$ in the transport direction is printed is 2, and the encoder value in a case where the rear end thereof is printed is 1000.

Here, it is known that the 5th pixel from the front end of the imaging data $D_S$ in the transport direction corresponds to a region printed with the encoder value of 2 of the reference data $D_R$, and the 100th pixel from the front end in the transport direction corresponds to a region printed with the encoder value of 1000 of the reference data $D_R$, on the basis of the print timing information. The pixel and the encoder value need only be made to correspond to each other through the interpolation, for the region between these.

In this way, the print timing information is used, so that it is possible to perform registration between the imaging data $D_S$ and the reference data $D_R$ in the transport direction.

A value other than the encoder value may be used for the print timing information. For example, in the case of the inkjet printing device 100 that performs printing at a constant clock from the print start timing, the elapsed time from the print start timing may be used as the print timing information.

In addition, the print timing information may have a profile different from that of the captured image, or may be held in a form of being added to the captured image. In a case where the line sensor is used as the scanner 132 as in the present embodiment, it is less costly and less risky to perform the embedding in the image in a processing device (for example, the imaging control unit 180) that processes information of the line sensor rather than to generate the profile, because the processing of each line is performed at high speed.

In a case where printing of the reference data is started at the print start timing, the print start timing is timed, whereby it is possible to perform registration between the imaging data and the reference data in the transport direction. However, since the relationship between the reading start position of the scanner 132 and the print start position of the reference data differs depending on the attachment position of the scanner 132, the relationship varies from machine to machine due to variations in attachment dimensions at the time of installation. In this case, it is necessary to calculate the print start position of the reference data or perform conversion into absolute information.

Specific examples of the calculation method of the print start position include calculating (an example of the start timing calculation process of calculating the print start timing of the reference data) the print start timing of the reference data on the basis of the position of the reference line of the imaging data calculated when analyzing the correction pattern and the print start timing of the reference line. In a case of analyzing a correction chart captured before printing or a correction pattern printed during printing, the reference line for obtaining the analysis position of the correction pattern is obtained from the coordinates of the captured image (chart-captured image), whereby it is possible to obtain the offset value (correction coefficient) on the basis of the encoder value at the time of printing in which the reference line is printed and the encoder value when the position of the reference line of the imaging data is read. With this, it is possible to acquire the print timing information in which the print start timings of the reference data and the imaging data are synchronized.

Figure 8:
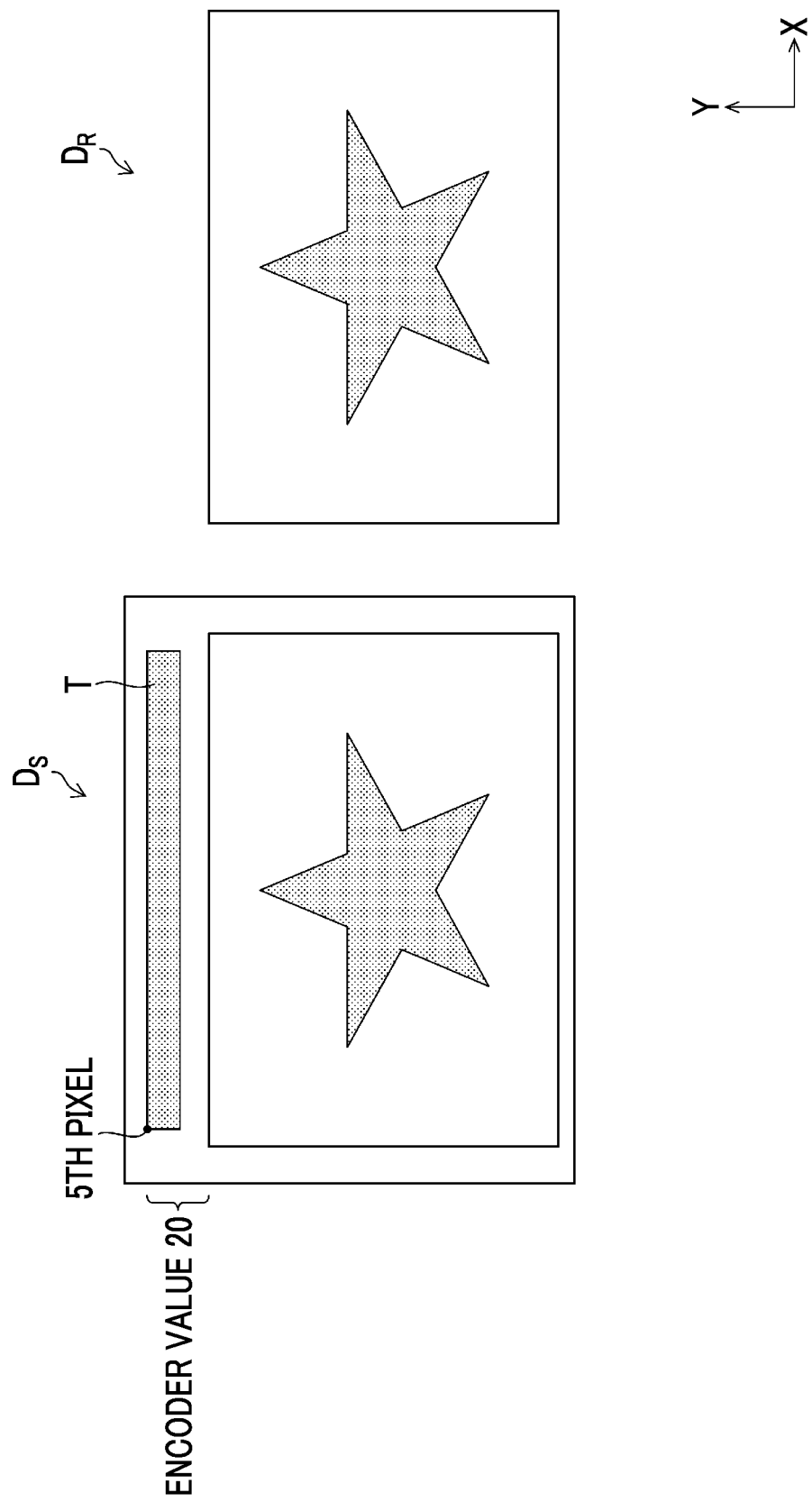
FIG. 8 is a diagram showing an example of the imaging data and the reference data.

FIG. 8 is a diagram showing an example of the imaging data $D_S$ and the reference data $D_R$. As shown in FIG. 8, in this example, a test pattern T is printed in a region on the upstream side of the print region of the reference data $D_R$ in the transport direction of the paper P.

The reading start position of the scanner 132 and the start of the test pattern T in the transport direction vary depending on the dimensions of the machine and the like. Therefore, the relationship between the start position of the test pattern T in the transport direction and the start position of the imaging data $D_S$ in the transport direction is calculated from the encoder value at the time of printing.

The imaging data of the test pattern T is analyzed, and which position of the imaging data is the start position of the test pattern T is known from the reference line position (the beginning of the test pattern T) of the test pattern T. With this, the correspondence between the encoder value in the imaging data and the encoder value at the time of printing is known.

For example, it is assumed that the printing of the reference data $D_R$ is started from a position where the encoder value advances by 20 with respect to the start position of the test pattern T. In this case, the start position of the test pattern T is detected from the imaging data, whereby it is known that the position where the encoder value in the imaging data advances by 20 from the start position of the test pattern T is the start of a region where the reference data $D_R$ is printed, on the basis of the print timing information.

The test pattern T may be printed after printing the reference data $D_R$. That is, the test pattern T may be disposed on the downstream side of the print region of the reference data $D_R$.

<Method of Manufacturing Printed Matter>

Figure 9:
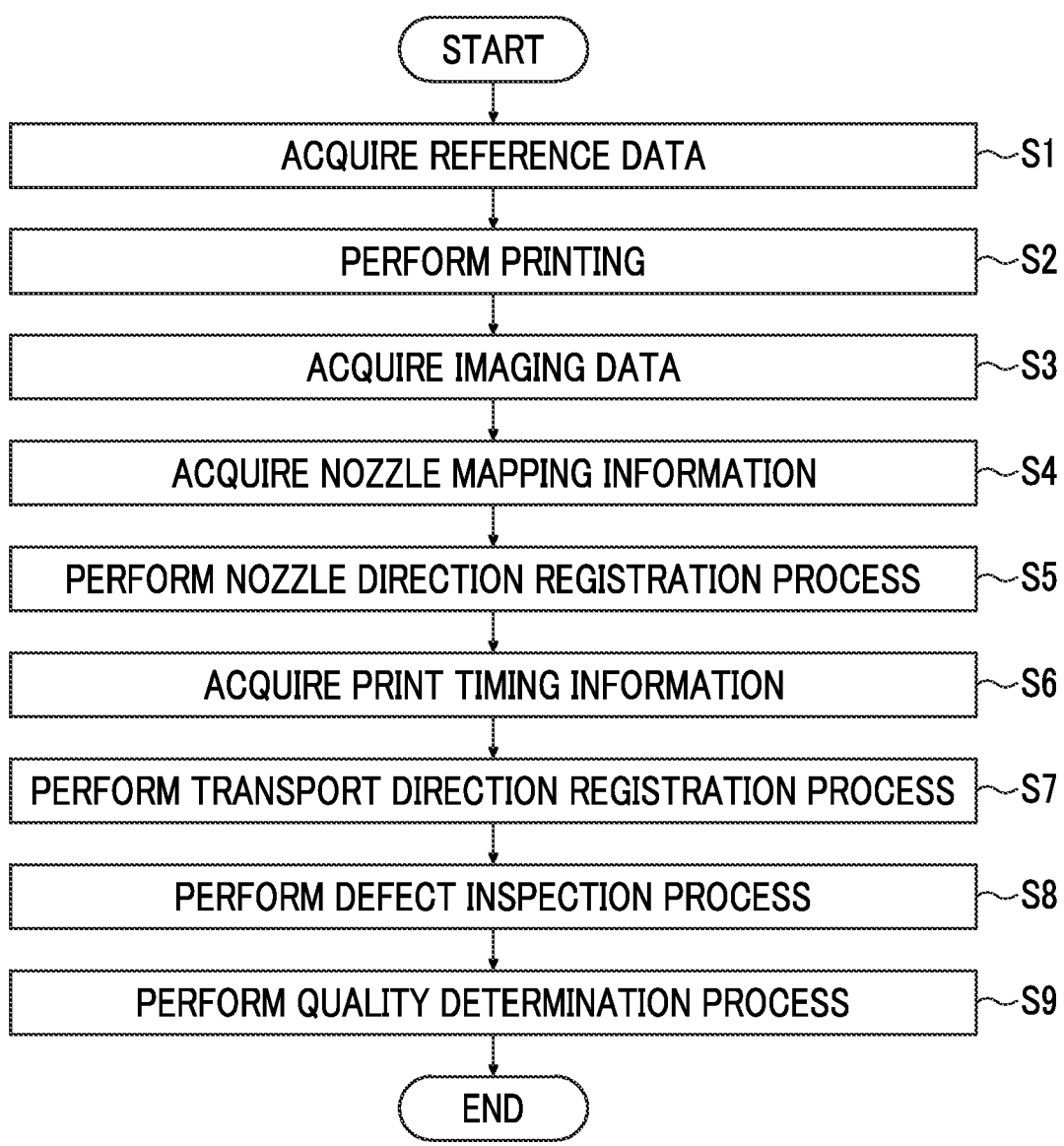
FIG. 9 is a flowchart showing processing of a method of manufacturing a printed matter.

FIG. 9 is a flowchart showing processing of the method of manufacturing the printed matter. The method of manufacturing the printed matter is stored in the storage unit 172 as the program to be executed by a computer.

In step S1 (an example of the data acquisition step), the registration processing unit 16 of the processor 12 acquires the reference data based on the print source image of the printed matter for which the defect inspection is performed, from the storage unit 172. The registration processing unit 16 may acquire the reference data from the memory 14. The registration processing unit 16 may acquire the reference data before the start of printing on the paper P.

In step S2 (an example of the printing step), the inkjet printing device 100 prints the printed matter on the basis of the reference data acquired in step S1.

In step S3 (an example of the data acquisition step), the registration processing unit 16 acquires the imaging data of the printed matter for which the defect inspection is performed. That is, the imaging control unit 180 causes the scanner 132 to read the image printed on the paper P in synchronization with the encoder value acquired via the transport control unit 176. The registration processing unit 16 acquires the captured image read by the scanner 132 as the imaging data.

In step S4 (an example of the nozzle mapping information acquisition step), the nozzle direction registration processing unit 18 of the registration processing unit 16 acquires the nozzle mapping information from the nozzle mapping information holding unit 20. The nozzle direction registration processing unit 18 may acquire nozzle mapping information from the memory 14 or the storage unit 172. The defect inspection device 10 prints the nozzle defect detection pattern on the paper P in advance, acquires the nozzle mapping information by analyzing the nozzle defect detection pattern, and causes the nozzle mapping information holding unit 20 to hold the acquired nozzle mapping information.

In step S5 (an example of the nozzle direction registration step), the nozzle direction registration processing unit 18 uses the nozzle mapping information acquired in step S4 to perform the nozzle direction registration process of performing registration between the reference data acquired in step S1 and the imaging data acquired in step S3 in the nozzle direction.

In step S6 (an example of the print timing information acquisition step), the transport direction registration processing unit 22 of the registration processing unit 16 acquires the print timing information from the print timing information holding unit 24. The transport direction registration processing unit 22 may acquire the print timing information from the memory 14 or the storage unit 172. The defect inspection device 10 prints the chart having the reference line on the paper P in advance, acquires the print timing information by analyzing the position of the reference line, and causes the print timing information holding unit 24 to hold the acquired print timing information.

In step S7 (an example of the transport direction registration step), the transport direction registration processing unit 22 uses the print timing information acquired in step S6 to perform the transport direction registration process of performing registration between the reference data and the imaging data, which have been subjected to registration in the nozzle direction in step S4, in the transport direction.

In step S8 (an example of the defect inspection step), the defect inspection processing unit 26 of the processor 12 performs the defect inspection process of calculating the defect information of the printed matter by inputting the post-registration image data consisting of the imaging data and the reference data, which have been subjected to registration, into the deep learning model 28, and outputs the calculated defect information. The inkjet printing device 100 performs the processing up to step S8 until the paper P printed in step S2 reaches the sorting unit 150.

In step S9 (an example of the quality determination step), the sorting unit 150 determines the quality of the printed matter on the basis of the defect information output in step S8, and controls the stamper 152 according to the determination.

This is the end of processing of the method of manufacturing the printed matter. In the flowchart shown in FIG. 9, step S1 and steps S3 to S8 constitute the defect inspection method according to the present embodiment. The defect inspection method may be stored in the memory 14 as the program to be executed by the computer, or may be executed by the processor 12.

<Defect Inspection Using Deep Learning>

In a case where print data based on the print source image of the printed matter is used as the reference data, since the difference, such as different data formats, between four channels, that is, cyan (C), magenta (M), yellow (Y), and black (K), and three channels, that is, red (R), green (G), and blue (B), occurs, preprocessing for matching the characteristics thereof is required.

Regarding the difference between CMYK and RGB, conventionally, a method of matching the color characteristics by creating a table for matching the color profiles between the print data and the imaging data is used. However, since the color profile differs depending on the difference in the above printing conditions and there are a wide variety of conditions, such as a difference in printing device and a difference in paper depending on a country, there is a problem that individually creating the table corresponding to each characteristic takes time and is complicated.

In response to the above problem, attention is paid to deep learning, which has been widely used in recent years in order to automate the extraction of parameters and feature amounts. Deep learning is one of the machine learning methods, and is known to have much higher performance than the conventional machine learning methods in the field of image recognition.

In deep learning, a pooling layer is generally introduced in order to respond to variations in size and position of a recognition target in training data. The pooling layer is a layer that performs processing of integrating the pixel values of adjacent pixels into one and compressing the image size, and a plurality of the pooling layers are introduced so that the recognition target can be identified regardless of the position in the data.

The measures for the positional variation using the pooling layer are effective, for example, in a case where the recognition target exists near the edge of the training data and in a case where the size of the recognition target is small, but there is a problem that it is not possible to respond to misregistration between two pieces of data in a case where two different pieces of data are input. For example, in a case where a learning model that determines the defect from the imaging data in response to an input of the print data and the imaging data is considered, the learning model cannot determine whether to have the defect or the pattern when misregistration occurs between the print data and the imaging data.

On the other hand, with the defect inspection method using the defect inspection device 10, it is possible to inspect the defect of the printed matter by performing registration between the reference data and the imaging data of the printed matter printed on the basis of the reference data with high accuracy at high speed. Therefore, the printed matter can be appropriately inspected by using the deep learning.

<Others>

The technical scope of the present invention is not limited to the scope described in the above embodiment. The configurations and the like in each embodiment can be appropriately combined between the respective embodiments without departing from the gist of the present invention.

EXPLANATION OF REFERENCES

10: defect inspection device
12: processor
14: memory
16: processing unit
18: processing unit
20: nozzle mapping information holding unit
22: processing unit
24: print timing information holding unit
26: defect inspection processing unit
28: deep learning model
100: inkjet printing device
110: transport unit
112: upstream pulley
113: rotary encoder
114: downstream pulley
116: transport belt
120: printing unit
122C: inkjet head
122K: inkjet head
122M: inkjet head
122Y: inkjet head
124: nozzle surface
126: nozzle
130: imaging unit
132: scanner
134: reading surface
136: light-receiving element
140: drying unit
142: heater
150: sorting unit
152: stamper
160: sheet discharge unit
162: sheet discharge tray 170: user interface
172: storage unit
174: general control unit
176: transport control unit
178: print control unit
180: imaging control unit
182: drying control unit
184: sorting control unit
186: sheet discharge control unit
S1 to S7: each step of a defect inspection method

What is claimed is:

1. A defect inspection device that inspects a defect of a printed matter printed on the basis of reference data by a single-pass type printing device that includes an inkjet head having a plurality of nozzles disposed in a nozzle direction and a moving mechanism configured to move the inkjet head and a print medium relative to each other in a relative movement direction intersecting with the nozzle direction, the defect inspection device comprising:
   a memory configured to store a command to be executed by one or more processors; and
   the one or more processors being configured to execute the command stored in the memory,
   wherein the one or more processors are configured to:
      acquire the reference data and imaging data based on a captured image in which the printed matter is imaged;
      acquire nozzle mapping information indicating a correspondence relationship between positions of the plurality of nozzles and pixel positions of the imaging data in the nozzle direction;
      perform a nozzle direction registration process of performing registration between the imaging data and the reference data in the nozzle direction by using the nozzle mapping information; and
      perform a defect inspection process of calculating defect information in response to an input of the imaging data and the reference data after performing the nozzle direction registration process.

2. The defect inspection device according to claim 1, wherein the one or more processors are configured to:
   acquire print timing information indicating a correspondence relationship between a print timing of the reference data and the pixel position of the imaging data in the relative movement direction;
   perform a relative movement direction registration process of performing registration between the imaging data and the reference data in the relative movement direction by using the print timing information; and
   perform the defect inspection process of calculating the defect information in response to an input of the imaging data and the reference data after performing the nozzle direction registration process and the relative movement direction registration process.

3. The defect inspection device according to claim 2, wherein the relative movement direction registration process has a start timing calculation process of calculating a print start timing of the reference data in the print timing information.

4. The defect inspection device according to claim 3, wherein in the start timing calculation process, a chart-captured image in which a correction chart having a reference line is imaged is analyzed, and a position of the reference line is used.

5. The defect inspection device according to claim 2, wherein the print timing information is information based on an encoder value of the moving mechanism.

6. The defect inspection device according to claim 5, wherein the encoder value is embedded in the captured image.

7. The defect inspection device according to claim 1, wherein the nozzle mapping information includes at least one of a plurality of information corresponding to a thickness of the print medium or information corrected by a correction process corresponding to the thickness.

8. The defect inspection device according to claim 1, wherein the one or more processors are configured to perform the defect inspection process by using a deep learning model that receives the imaging data and the reference data, as an input.

9. The defect inspection device according to claim 1, wherein the one or more processors are configured to perform the defect inspection process of calculating the defect information in response to the input of the imaging data and the reference data that have been subjected to the registration.

10. A single-pass type printing device that includes an inkjet head having a plurality of nozzles disposed in a nozzle direction and a moving mechanism configured to move the inkjet head and a print medium relative to each other in a relative movement direction intersecting with the nozzle direction, the printing device comprising:
    a scanner configured to image the printed matter to generate a captured image; and
    the defect inspection device according to claim 1.

11. A defect inspection method of inspecting a defect of a printed matter printed on the basis of reference data by a single-pass type printing device that includes an inkjet head having a plurality of nozzles disposed in a nozzle direction and a moving mechanism configured to move the inkjet head and a print medium relative to each other in a relative movement direction intersecting with the nozzle direction, the defect inspection method comprising:
    acquiring the reference data and imaging data based on a captured image in which the printed matter is imaged;
    acquiring nozzle mapping information indicating a correspondence relationship between positions of the plurality of nozzles and pixel positions of the imaging data in the nozzle direction;
    performing a nozzle direction registration process of performing registration between the imaging data and the reference data in the nozzle direction by using the nozzle mapping information; and
    performing a defect inspection process of calculating defect information in response to an input of the imaging data and the reference data after performing the nozzle direction registration process.

12. The defect inspection method according to claim 11, wherein the defect inspection process of calculating the defect information is performed in response to the input of the imaging data and the reference data that have been subjected to the registration.

13. A method of manufacturing a printed matter, comprising:
    printing a printed matter on the basis of reference data through a single-pass type printing device that includes an inkjet head having a plurality of nozzles disposed in a nozzle direction and a moving mechanism configured to move the inkjet head and a print medium relative to each other in a relative movement direction intersecting with the nozzle direction;

performing the defect inspection method according to claim 11; and determining quality of the printed matter on the basis of the defect information.

14. A non-transitory, computer-readable tangible recording medium having a program for causing, when read by a computer, the computer to perform the defect inspection method according to claim 11 recorded thereon.

* * * * *